United States Patent
Lowry et al.

(10) Patent No.: US 10,168,910 B2
(45) Date of Patent: Jan. 1, 2019

(54) STORAGE AREA NETWORK RECLAMATION FOR VIRTUAL ENVIRONMENTS

(71) Applicant: International Business Machines Corporation, Armonk, NY (US)

(72) Inventors: Debora A. Lowry, Ellensburg, WA (US); Blanca R. Navarro Piedra, Heredia (CR); Jose D. Ramos Chaves, Heredia (CR); Willy A. Vargas Solis, San Jose (CR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/454,281

(22) Filed: Mar. 9, 2017

(65) Prior Publication Data

US 2018/0260131 A1  Sep. 13, 2018

(51) Int. Cl.
*G06F 3/06* (2006.01)
(52) U.S. Cl.
CPC ............ *G06F 3/0608* (2013.01); *G06F 3/067* (2013.01); *G06F 3/0653* (2013.01)
(58) Field of Classification Search
CPC ....... G06F 3/067; G06F 3/0608; G06F 3/0653
USPC ........................................................ 711/166
See application file for complete search history.

(56) References Cited

U.S. PATENT DOCUMENTS

| | | | |
|---|---|---|---|
| 7,603,532 B2 | 10/2009 | Rajan et al. | |
| 8,086,652 B1 | 12/2011 | Bisson et al. | |
| 9,710,165 B1 * | 7/2017 | Lherault | G06F 3/0608 |
| 2012/0303923 A1 | 11/2012 | Behera et al. | |
| 2012/0311291 A1 | 12/2012 | Fiske et al. | |
| 2013/0275593 A1 * | 10/2013 | Tseitlin | G06F 9/5022 709/226 |
| 2016/0019004 A1 | 1/2016 | Starks et al. | |

OTHER PUBLICATIONS

Raxco, Lauren; "New: Automatic VMware EXXi Host Space Reclamation"; Raxco Software Blog; Copyright 2016 Raxco Software Blog; Printed Mar. 9, 2017; 9 Pages; <http://blog.raxco.com/2015/05/21/new-automatic-vmware-esxi-hot-space-reclaimation/>.
Unknown; "Using the esxcli storage vmfs unmap command to reclaim VMFS deleted blocks on thin-provisioned LUNs"; vmware Knowledge Base; Printed Mar. 9, 2017; 2 Pages; <https://kb.vmware.com/selfservice/microsites/search.do?language=en_US&cm=displayKC&externalId=-2057513>.

* cited by examiner

*Primary Examiner* — Hua J Song
(74) *Attorney, Agent, or Firm* — Robert Shatto; Hoffman Warnick LLC

(57) ABSTRACT

A system, method and program product for reclaiming storage volumes in a storage area network (SAN). A method is disclosed that includes: monitoring each of a set containers implemented by a physical host, wherein each container holds a set of storage volumes that are mapped to a storage pool via a SAN switch; determining whether unused volumes in a selected container exceed an empty capacity threshold; in response to the empty capacity threshold being exceeded, determining whether an idle time threshold for the unused volumes has been exceeded with no I/O activity; and in response to the idle time threshold being exceeded with no I/O activity, separating the unused volumes from the selected container, un-mapping the unused volumes from the physical host, and returning the unused volumes to the storage pool.

20 Claims, 3 Drawing Sheets

STORAGE AREA NETWORK RECLAMATION FOR VIRTUAL ENVIRONMENTS

TECHNICAL FIELD

The subject matter of this invention relates to storage area networks, and more particularly to an automated storage reclamation process for virtual environments in storage area networks.

BACKGROUND

Storage area networks (SANs) are networks that provide access to consolidated, block level data storage. SANs help to increase storage capacity utilization by allowing multiple servers to consolidate private storage space onto pooled storage devices. In this manner, storage is virtualized in that host or server capacity is no longer tied to single storage devices.

Allocating capacity resources to virtualize storage images generally involves two different entities: (1) the SAN administrator, who is in charge of creating virtual block resources at a storage appliance and mapping the resources to a physical host device; and (2) the system administrator who either creates or updates a data container with the virtual block or assigns the virtual block to a virtual image. One of the challenges with such a system however involves identifying and reclaiming unused virtual blocks. Currently, there is no simple mechanism for determining which blocks are available for reclamation in a virtual data container, resulting in virtual containers with unused block storage capacity and storage devices with peak limits.

SUMMARY

Aspects of the disclosure provide a reclamation system and process for reclaiming storage volumes from a physical host in a storage are network (SAN) environment.

A first aspect discloses a storage area network (SAN) system, having: a storage appliance that manages a storage pool containing physical storage volumes; a physical host connected to the storage appliance via a SAN switch, wherein the physical host includes a system for receiving mapped storage volumes from the storage appliance, and further includes a system for allocating the mapped storage volumes into a set of containers that provide virtual storage images for external resources; and a SAN reclamation system that monitors each of the containers, and for each container: determines whether unused volumes in the container exceed an empty capacity threshold; and in response to the empty capacity threshold being exceeded, determines whether an idle time threshold for the unused volumes has been exceeded with no I/O activity; and in response to the idle time threshold being exceeded with no I/O activity, separates the unused volumes from the container, un-maps the unused volumes from the physical host, and returns the unused volumes to the storage pool.

A second aspect discloses a computer program product stored on a computer readable storage medium, which when executed by a computing system, provides a reclamation service for a storage area network (SAN), the program product having: program code that monitors each of a set containers implemented by a physical host, wherein each container holds a set of storage volumes that are mapped to a storage pool via a SAN switch; program code that determines whether unused volumes in a selected container exceed an empty capacity threshold; program code that, in response to the empty capacity threshold being exceeded, determines whether an idle time threshold for the unused volumes has been exceeded with no I/O activity; and program code that, in response to the idle time threshold being exceeded with no I/O activity, separates the unused volumes from the selected container, un-maps the unused volumes from the physical host, and returns the unused volumes to the storage pool.

A third aspect discloses a computerized method that reclaims storage volumes in a storage area network (SAN), including: monitoring each of a set containers implemented by a physical host, wherein each container holds a set of storage volumes that are mapped to a storage pool via a SAN switch; determining whether unused volumes in a selected container exceed an empty capacity threshold; in response to the empty capacity threshold being exceeded, determining whether an idle time threshold for the unused volumes has been exceeded with no I/O activity; and in response to the idle time threshold being exceeded with no I/O activity, separating the unused volumes from the selected container, un-mapping the unused volumes from the physical host, and returning the unused volumes to the storage pool.

BRIEF DESCRIPTION OF THE DRAWINGS

These and other features of this invention will be more readily understood from the following detailed description of the various aspects of the invention taken in conjunction with the accompanying drawings in which.

Figure 1:
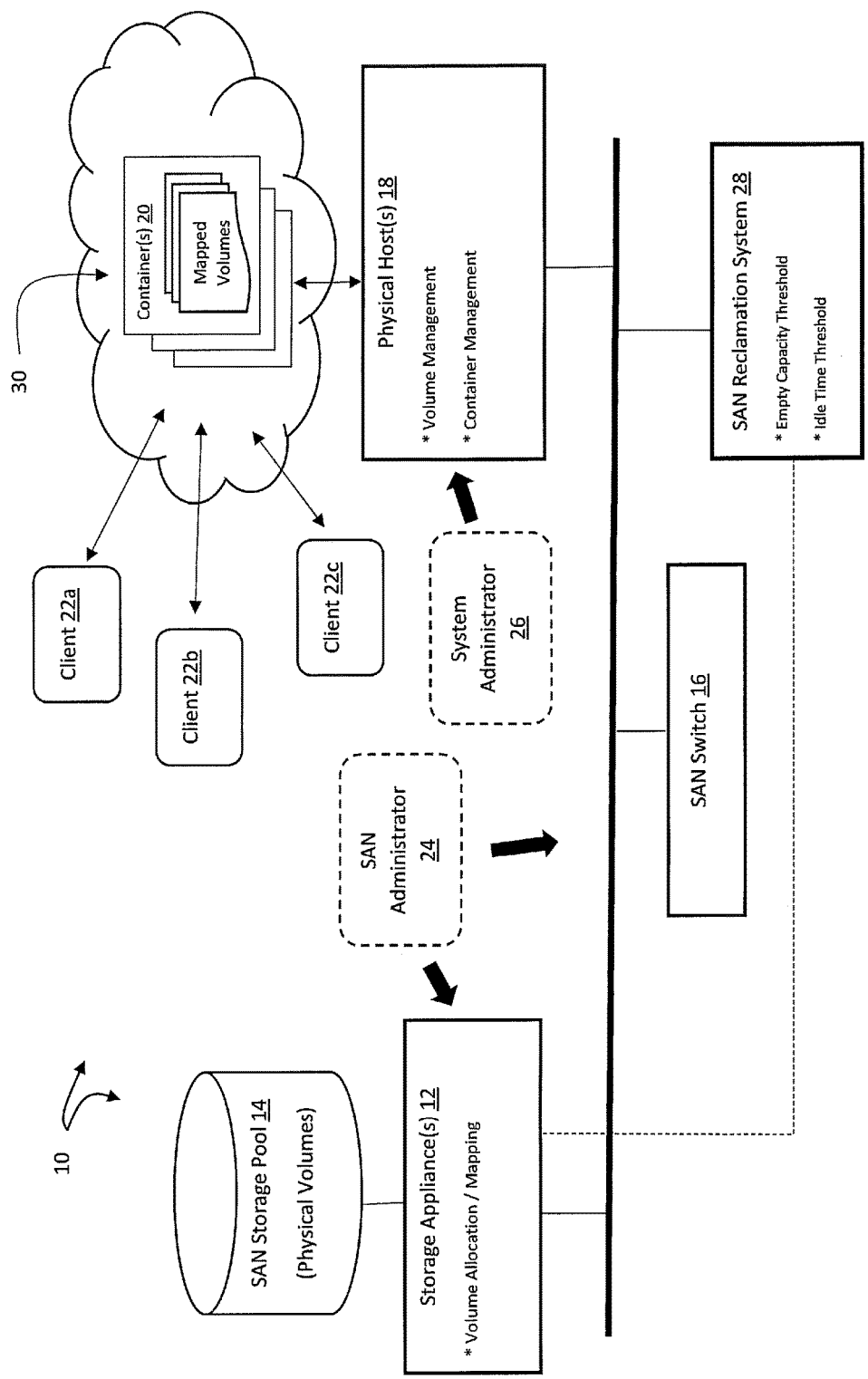
FIG. 1 shows a SAN system according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Referring now to the drawings, FIG. 1 depicts a storage area network (SAN) system 10 that generally includes a storage appliance 12 that allocates and maps physical volumes of memory from a SAN storage pool 14 to a physical host 18 via a SAN switch 16. Note that for the purposes of this disclosure, the terms "volume" and "block" are used interchangeably, and generally refer to a unit of storage. The physical host 18 (e.g., VIO, ESX, etc.) is responsible for managing the allocated volumes and creating associated containers 20 that provide virtual memory images to external resources, such as clients 22a,b,c in a cloud environment. In a typical SAN system 10, the storage appliance 12 and SAN switch 16 are managed by a SAN administrator 24 and the physical host 18 is managed by a system administrator 26.

As noted, in a traditional SAN environment, the SAN administrator 24 does not have access to manage or reclaim storage volumes/containers 20 implemented or allocated by the physical host 18. To address this, the described SAN system 10 includes a SAN reclamation system 28 that allows empty or unused volumes assigned to containers 20 by the physical host 18 to be automatically reclaimed by the storage appliance 12 under predefined conditions. Note that although the SAN reclamation system 28 is shown as standalone system in FIG. 1, it is understood that the SAN reclamation system 28 could be incorporated into any of the components of the SAN system 10. For example, in one illustrative embodiment, SAN reclamation system 28 can be integrated into the physical host 18. It is also understood that the SAN system 10 may include other components such as additional hosts, storage appliances, etc.

SAN reclamation system 28 (see also FIG. 2) provides automated space reclamation by evaluating performance information 64 against two threshold parameters: (1) an "empty capacity" threshold 60; and (2) an "idle time" threshold 62. A first performance measurement determines if the number of unused volumes of storage in each container 20 exceeds the empty capacity threshold 60. If the empty capacity threshold 60 is exceeded for a container 20, a second performance measurement tracks how long the unused volumes remain idle with no I/O activity, and determines if the idle time threshold 62 is exceeded. The performance information 64 may for example be acquired from the storage appliance 12. When the empty capacity (i.e., number of unused volumes) of a data container 20 rises above the empty capacity threshold 60 and no activity is detected within the unused volumes beyond the idle time threshold 62, the unused volumes in the container 20 are reclaimed.

Figure 2:
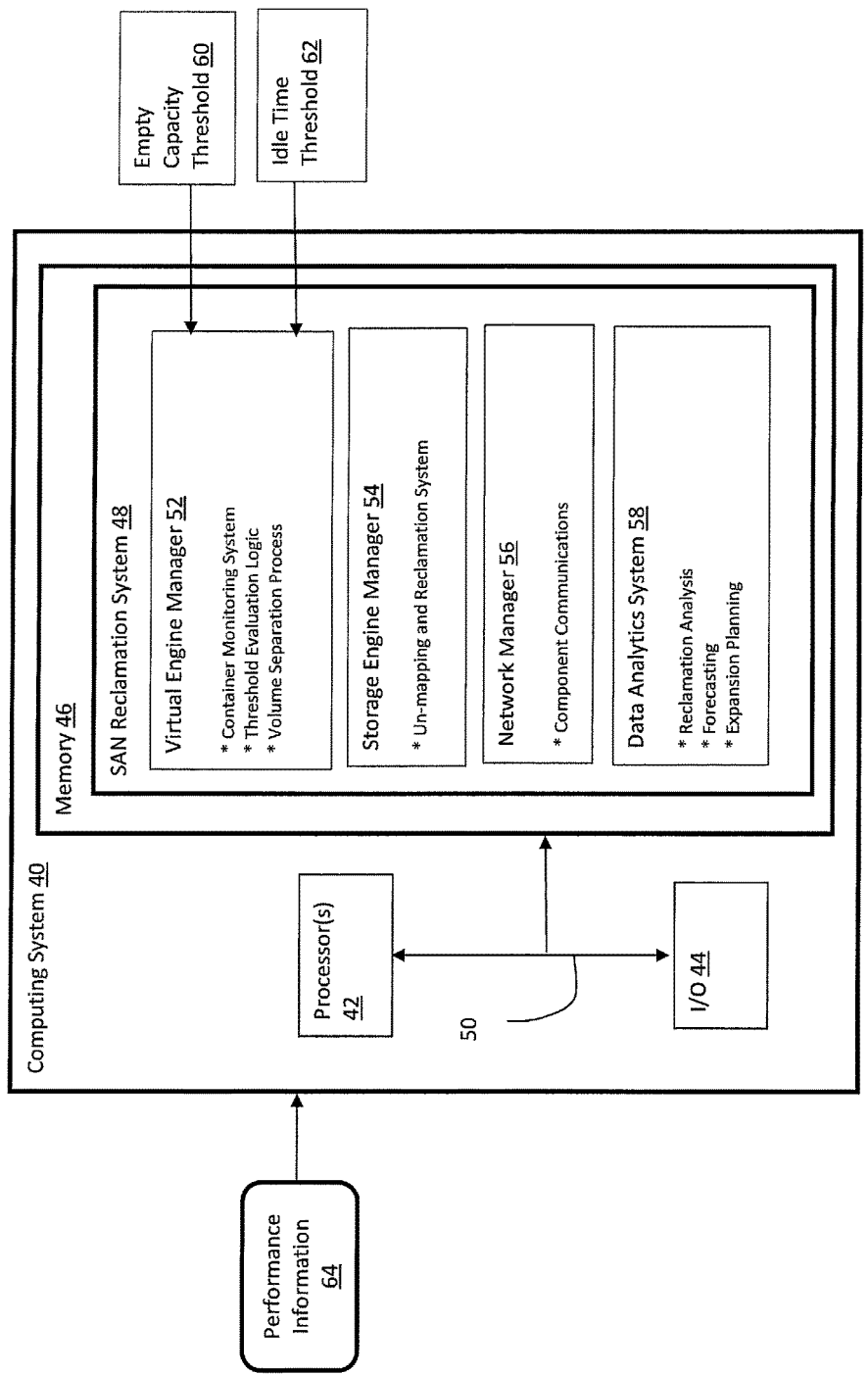
FIG. 2 shows a computing system having a reclamation system according to embodiments.

FIG. 2 depicts an illustrative computing system 40 for implementing SAN reclamation system 48 (with continued reference to FIG. 1) based on inputted performance information 64. As shown, SAN reclamation system 48 includes a virtual engine manager 52 that receives and stores the empty capacity threshold 60 and idle time threshold 62 parameters. These parameters may for example be determined by the system administrator 26 or some automated process. Virtual engine manager 52 includes a container monitoring system that monitors performance information 64 associated with all of the containers 20 allocated by the physical host 18 and applies threshold evaluation logic to determine when unused volumes should be reclaimed. Once the virtual engine manager 52 determines that a reclamation is required, a volume separation process is enacted to separate the unused volumes from the container 20 at the physical host 18.

Storage engine manager 54 is responsible for un-mapping the volumes being reclaimed between the storage appliance 12 and physical host 18, and reclaiming the volumes back to the SAN storage pool 14, where they can be made available, e.g., to other hosts or services. Accordingly, the storage engine manager 54 is configured to interface with the storage appliance 12 to effectuate the un-mapping process.

Network manager 56 is responsible for managing all of the component communications. Network manager 56 accordingly handles communication with the storages appliance 12, physical host 18, virtual memory images and data containers 20. Implementation may for example be customizable for the particular environment in which the SAN reclamation system 48 is implemented.

Data analytics system 58 retrieves and stores information from both the virtual engine manager 52 and storage engine manager 54 to provide on-going analysis of memory usage and reclamation behaviors. Data analytics system 58 also then provides forecasting of future memory usage and reclamation patterns, and utilizes these forecasts to plan and project for dates at which the SAN storage pool 14 resources will require expansion.

Figure 3:
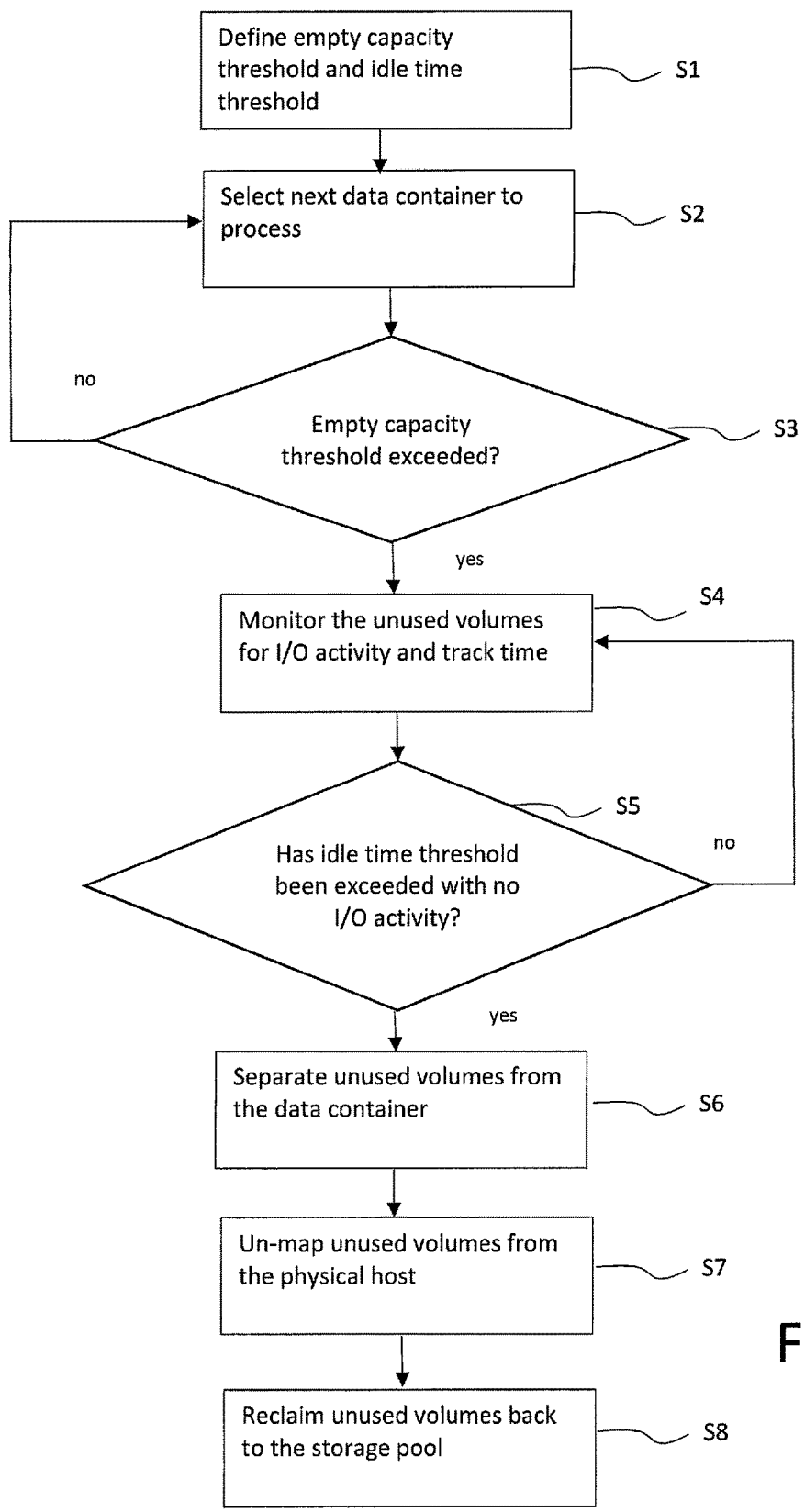
FIG. 3 shows a flow diagram showing method of implementing the reclamation system according to embodiments.

FIG. 3 depicts an illustrative method of implementing the SAN reclamation system 48 and associated threshold evaluation logic, with reference to FIGS. 1 and 2. At S1, the empty capacity threshold 60 and idle time threshold 62 parameters are defined. For example, the empty capacity threshold 60 may be a fixed value such as "20 empty volumes," a percentage such as "50% empty," or any other value. Idle time threshold 62 may for example comprise a time value, such as "48 hours." These threshold parameters are generally preselected and set for ongoing processing, but can be changed as needed in either a manual or automated process.

At S2, a next data container 20 for processing is selected and at S3, a determination is made whether the empty capacity threshold 60 is exceeded for the selected container 20, e.g., does the container 20 include more than 20 empty volumes? If no, then a next container 20 is selected for processing at S2. If yes, then the unused volume space in the container 20 is monitored for I/O activity and a time is tracked at S4. I/O activity generally refers to any data read or writes into the volume space being monitored.

At S5, a determination is made whether the idle time threshold 62 has been exceeded with no I/O activity, e.g., has there been any I/O activity in the unused volumes over the past 48 hours? If no, then the monitoring process can be repeated at S4 to recheck again for I/O activity. Alternatively, the process may return to S3 to again check the empty capacity threshold 60, or return to S2 where a next data container 20 is processed (not shown). If the idle time threshold 62 is however exceeded at S5, then the unused volumes are separated from the data container 20 at the physical host 18 at S6. Next at S7, the unused volumes are unmapped from the physical host 18 and at S8 the volumes are reclaimed back to the SAN storage pool 14 via the storage appliance 12. Note that while the method is generally described as a single threaded process, it is understood that some or all of the reclamation processing may be done using multiple threads.

It is also understood that SAN reclamation system 28 may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computing system 10 that may comprise any type of computing device and for example includes at least one processor 12, memory 16, an input/output (I/O) 14 (e.g., one or more I/O interfaces and/or devices), and a communications pathway 17. In general, processor(s) 12 execute program code which is at least partially fixed in memory 16. While executing program code, processor(s) 12 can process data, which can result in reading and/or writing transformed data from/to memory and/or I/O 14 for further processing. The pathway 17 provides a communications link between each of the components in computing system 10. I/O 14 can comprise one or more human I/O devices, which enable a user to interact with computing system 10. Computing system 10 may also be implemented in a distributed manner such that different components reside in different physical locations.

Furthermore, it is understood that the SAN reclamation system 28 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A storage area network (SAN) system, comprising:
a storage appliance that manages a SAN storage pool containing physical storage volumes;
a physical host connected to the storage appliance via a SAN switch, wherein the physical host includes a system for receiving mapped storage volumes from the storage appliance, and further includes a system for allocating the mapped storage volumes into a set of containers that provide virtual storage images for external resources; and
a SAN reclamation system that monitors each of the containers, and for each container:
determines whether unused volumes in the container exceed an empty capacity threshold; and
in response to the empty capacity threshold being exceeded, determines whether an idle time threshold for the unused volumes has been exceeded with no I/O activity; and
in response to the idle time threshold being exceeded with no I/O activity, separates the unused volumes from the container, un-maps the unused volumes from the physical host, and returns the unused volumes to the SAN storage pool.

2. The SAN system of claim 1, wherein the external resources comprise clients.

3. The SAN system of claim 1, wherein the empty capacity threshold comprises a predetermined number of volumes.

4. The SAN system of claim 1, wherein the idle time threshold comprises a predetermined time value.

5. The SAN system of claim 1, wherein the SAN reclamation system further includes a data analytics system that stores and analyzes reclamation activities, and forecasts future storage requirements of the SAN storage pool based on an analysis.

6. The SAN system of claim 1, wherein the SAN reclamation system interfaces with the physical host to separate unused volumes from the container and interfaces with the storage appliance to un-map the unused volumes from the physical host.

7. The SAN system of claim 1, wherein the SAN reclamation system includes a network manager for managing communications with the storage appliance, SAN switch, and physical host.

8. A computer program product stored on a computer readable storage medium, which when executed by a computing system, provides a reclamation service for a storage area network (SAN), the program product comprising:
program code that monitors each of a set containers implemented by a physical host, wherein each container holds a set of storage volumes that are mapped to a SAN storage pool via a SAN switch;
program code that determines whether unused volumes in a selected container exceed an empty capacity threshold;
program code that, in response to the empty capacity threshold being exceeded, determines whether an idle time threshold for the unused volumes has been exceeded with no I/O activity; and
program code that, in response to the idle time threshold being exceeded with no I/O activity, separates the unused volumes from the selected container, un-maps the unused volumes from the physical host, and returns the unused volumes to the SAN storage pool.

9. The program product of claim 8, wherein the empty capacity threshold comprises a predetermined number of volumes.

10. The program product of claim 8, wherein the idle time threshold comprises a predetermined time value.

11. The program product of claim 8, further comprising program code that stores and analyzes reclamation activities, and forecasts future storage requirements of the SAN storage pool based on an analysis.

12. The program product of claim 8, further comprising program code that interfaces with the physical host to separate unused volumes from the container and program code that interfaces with a storage appliance to un-map the unused volumes from the physical host.

13. The program product of claim 12, further comprising program code for managing communications with the storage appliance, SAN switch, and physical host.

14. A computerized method that reclaims storage volumes in a storage area network (SAN), comprising:
monitoring each of a set containers implemented by a physical host, wherein each container holds a set of storage volumes that are mapped to a SAN storage pool via a SAN switch;
determining whether unused volumes in a selected container exceed an empty capacity threshold;
in response to the empty capacity threshold being exceeded, determining whether an idle time threshold for the unused volumes has been exceeded with no I/O activity; and
in response to the idle time threshold being exceeded with no I/O activity, separating the unused volumes from the selected container, un-mapping the unused volumes from the physical host, and returning the unused volumes to the SAN storage pool.

15. The computerized method of claim 14, wherein the empty capacity threshold comprises a predetermined number of volumes.

16. The computerized method of claim 14, wherein the idle time threshold comprises a predetermined time value.

17. The computerized method of claim 14, further comprising:
storing and analyzing reclamation activities; and
forecasting future storage requirements of the SAN storage pool based on an analysis.

18. The computerized method of claim 14, further comprising:
interfacing with the physical host to separate unused volumes from the container; and
interfacing with a storage appliance to un-map the unused volumes from the physical host.

19. The computerized method of claim 18, further comprising providing a network manager for managing communications with the storage appliance, SAN switch, and physical host.

20. The computerized method of claim 14, wherein the containers provide virtual storage images to external resources.

* * * * *